United States Patent
Kitamura et al.

(10) Patent No.: US 7,503,876 B2
(45) Date of Patent: Mar. 17, 2009

(54) APPARATUS FOR AND METHOD OF CONTROLLING AUTOMATIC TRANSMISSION

(75) Inventors: Toshio Kitamura, Ageo (JP); Isao Okamoto, Ageo (JP); Osamu Isobe, Ageo (JP); Akihisa Hayashi, Ageo (JP); Yuuichi Ichikawa, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 791 days.

(21) Appl. No.: 10/529,703

(22) Filed: Mar. 29, 2005

(65) Prior Publication Data

US 2008/0242505 A1    Oct. 2, 2008

Related U.S. Application Data

(63) Continuation of application No. PCT/JP03/12551, filed on Sep. 30, 2003.

(30) Foreign Application Priority Data

Sep. 30, 2002    (JP) ............................. 2002-286690

(51) Int. Cl.
*F16H 61/16*    (2006.01)
*F06F 7/00*    (2006.01)
(52) U.S. Cl. ........................................ 477/125; 701/62
(58) Field of Classification Search ................ 477/115, 477/116, 120, 125, 901, 904; 180/271; 701/62
See application file for complete search history.

(56) References Cited

U.S. PATENT DOCUMENTS

| | | | |
|---|---|---|---|
| 4,891,758 A | 1/1990 | Simonyi et al. | |
| 5,081,588 A * | 1/1992 | Holmes et al. | 701/52 |
| 5,679,095 A * | 10/1997 | Sekine et al. | 477/116 |
| 6,533,704 B2 * | 3/2003 | Saito et al. | 477/92 |
| 6,542,804 B2 * | 4/2003 | Muratomi | 701/62 |
| 6,893,378 B2 * | 5/2005 | Janecke et al. | 477/125 |
| 7,044,890 B2 * | 5/2006 | Kojima et al. | 477/175 |

FOREIGN PATENT DOCUMENTS

| | | |
|---|---|---|
| JP | 62-139831 | 10/1987 |
| JP | 62-143853 | 10/1987 |
| JP | 10-238617 | 8/1998 |
| JP | 2001-165294 | 6/2001 |
| JP | 2002-295665 | 10/2002 |

\* cited by examiner

*Primary Examiner*—Roger Pang
(74) *Attorney, Agent, or Firm*—Baker & Hostetler LLP

(57) ABSTRACT

In a departure standby state in which a transmission is shifted to a drive stage and a mechanical clutch is disengaged, if a vehicle speed is greater than or equal to a predetermined value, the transmission is shifted to the neutral, and then the mechanical clutch is engaged. Then, it is determined whether the transmission is being rotated in reverse or not based on a rotational fluctuation on the driving side or the driven side in the process for engaging the mechanical clutch. When an accelerator pedal is pressed down at an angle greater than or equal to a predetermined angle, or when a gear shift instruction is input from the shift lever, if the transmission is being rotated in reverse the transmission is inhibited from being shifted to the drive stage, while if the transmission is not being rotated in reverse the transmission is shifted to the drive stage according to the pressed down state of the accelerator pedal, or a gear shift in instruction.

14 Claims, 5 Drawing Sheets

APPARATUS FOR AND METHOD OF CONTROLLING AUTOMATIC TRANSMISSION

This application is a continuation of PCT/JP2003/012551, filed on Sep. 30, 2003.

BACKGROUND OF THE INVENTION

1. Field of the Invention

The present invention relates to a technique for controlling an automatic transmission including a mechanical clutch and a mechanical transmission and, in particular, to a technique for protecting a mechanical clutch when a vehicle moves backward in a so-called hill start.

2. Description of the Related Art

In recent years, automatic transmissions have been proposed (refer to Japanese Unexamined Patent Publication No. 2001-165294), that are configured to electronically control a mechanical clutch and a mechanical transmission (this type of transmissions will be hereunder referred to as "mechanical automatic transmissions"), thereby automatically changing gear to a drive stage according to traveling conditions. In a mechanical automatic transmission, since there is no fluid clutch (torque converter) in the driving force transmission system from the engine to the driving wheels, the driving force transmission efficiency is high, so that it is possible to improve fuel consumption. Furthermore, since there is no slipping sensation, which is peculiar to a fluid clutch, it is also possible to improve the drivability.

Incidentally, when starting on an uphill, when the brake is released from a departure standby state in which the transmission is shifted to the forward stage and the mechanical clutch is disengaged, there is a possibility that the vehicle moves backward due to gravity. At this tine, if the accelerator pedal is pressed down to start moving without noticing the vehicle moving backwards, since the input shaft of the transmission is reversed, the mechanical clutch is engaged in a state in which the relative rotational speed is high. Thus, there is concern that the mechanical clutch might be damaged. Conversely, on a downhill, when the brake is released from a departure standby state, there is a possibility that the vehicle is moved forward due to gravity. At this time, if the accelerator pedal is pressed down to start moving from a state in which the vehicle speed is high, the mechanical clutch is engaged in a state in which the rotation speed of the input shaft of the transmission is higher than the engine rotation speed. Therefore, there is concern not only that the mechanical clutch might be damaged, but that the engine be over-revolved.

In order to prevent such an undesirable situation from occurring, conventional techniques have prevented damage to the mechanical clutch by shifting the transmission to the neutral at the point in time when the vehicle speed reaches a predetermined value while in a departure standby state. Then, when the accelerator pedal or shift lever is operated after the transmission is shifted to the neutral, the transmission shifts automatically to the drive stage according to the operation, and starts driving straight away.

However, since the gearshift is performed according to the operation of the accelerator pedal or the shift lever, when the vehicle moves backward on an uphill, the mechanical clutch is sometimes engaged as before in a state in which the relative rotational speed is high. Therefore, there is concern that the mechanical clutch gets damage. There is also concern that such an undesirable situation may similarly occur, when an attempt is made to start the vehicle in reverse on a downhill.

Furthermore, a typical rotational speed sensor detects rotational speed by detecting the teeth of a gear using an electromagnetic pick up or a Hall element. In this case, since the rotational speed sensor detects only the teeth of the gear, it can only measure the absolute value of the rotational speed regardless of the direction of rotation. As a result, in the case where an occurrence of a reverse rotation of the transmission is to be determined using the rotational speed sensor, two rotational speed sensors must be installed for the same gear with their positional phases shifted, and the existence of a reverse rotation must be determined from the phase difference of their output signals. However, this method requires space to install the two rotational speed sensors, and installation accuracy, and also requires an electric circuit for exclusive use to perform signal processing with high accuracy. Hence, there is a problem of cost, and furthermore the burden on the control software is large.

SUMMARY OF THE INVENTION

Therefore, taking the above-described existing problems into consideration, the present invention has an object to provide a technique for controlling an automatic transmission in which a mechanical clutch is protected, by enabling a reverse rotation of the transmission to determined with a simple construction, and by preventing the transmission from being shifted to the drive stage when a vehicle moves backward in a so-called hill start.

In the present invention, when a vehicle is in a departure standby state, and the vehicle speed is greater than or equal to a predetermined value, the transmission is shifted to the neutral thereof, and the mechanical clutch is engaged. Here, if the transmission is shifted to the neutral, the inertia of the driven system is disconnected from the transmission. Therefore, even if the mechanical clutch is engaged in this state, there is no concern about it being damaged. Then, based on a rotational fluctuation on the driving side or the driven side in a process for engaging the mechanical clutch, it is determined whether the vehicle has been moved backward in a so-called hill start, and the transmission is being rotated in reverse or not, by receiving an input from the driving wheels. When the transmission is being rotated in reverse, then even if, for example, the driver presses the accelerator pedal down, or inputs a gear shift instruction by operating the shift lever, the transmission is prevented from being shifted to the drive stage. Accordingly, when the vehicle moves backward in a so-called hill start, the transmission is prevented from being shifted to the drive stage. Therefore, the mechanical clutch cannot be engaged in a state in which relative rotational speed is high, which can thus protect it. On the other hand, since it is determined whether the transmission is being rotated in reverse or not based on a rotational fluctuation on the driving side or the driven side in the process for engaging the mechanical clutch, it is possible to determine an occurrence of a reverse rotation using a simple construction.

Furthermore, preferably, it is determined that the transmission is being rotated in reverse when in the process for engaging the mechanical clutch, the rate of change of the rotational speed on the driving side or the driven side becomes greater than or equal to a predetermined upper limit value and less than or equal to a predetermined lower limit value. That is, when the transmission is being rotated in reverse, the reverse rotation is cancelled on the driven side during the process for engaging the mechanical clutch. Therefore, the rate of change of the rotational fluctuation on the driving side or the driven side drops significantly. After the reverse rotation is cancelled on the driven side, the rate of change of the rotational speed on the driving side or the driven side increases significantly and afterwards becomes steady at a constant value. Therefore, it is possible to determine whether the transmission is being rotated in reverse or not, by detecting a significant drop or increase in the rate of change of the rotational speed.

Instead of the reverse rotation determination as above, the arrangement may be such that it is determined that the transmission is being rotated in reverse when in the process for engaging the mechanical clutch, the rotational speed on the driven side is less than or equal to a predetermined value. That is, if the mechanical clutch is engaged while the transmission is being rotated in reverse, the reverse rotation on the driven side is gradually cancelled, so that a rotation starts in the same direction as the driving side. At this time, since the rotational speed is detected as an absolute value, the rotational speed on the driven side is zero momentarily. Accordingly, by detecting that the relational speed on the driven side is less than or equal to a predetermined value, it is possible to determine whether the transmission is being rotated in reverse or not.

Moreover, it is desirable to determine that the vehicle is in a departure standby state when the transmission is shifted to a drive stage and the mechanical clutch is disengaged. That is, when the driver operates to start the vehicle, he or she presses the clutch pedal down to disengage the clutch, and then performs a series of operations to shift the transmission to the drive stage. As a result, by conducting processing for determining a departure standby state, which reflects such operations by the driver, it is possible to perform gear shift control according to the driver's intention.

Furthermore, if the transmission is not being rotated in reverse when a departure operation for a vehicle is performed, it is desirable to shift the transmission to a drive stage according to a departure operation. By so doing, when the vehicle is not moving backward during a so-called hill start, the transmission is shifted to the drive stage. Therefore, it is possible to smoothly shift from the starting to a normal driving.

Moreover, preferably it is determined that a departure operation is performed when an accelerator pedal is pressed down at an angle greater than or equal to a predetermined angle, or when a gear shift instruction for the transmission is input. By so doing, when the vehicle is heading downhill due to gravity, it is possible to move the vehicle off straight away as per the driver's intention.

Furthermore, when the transmission is being rotated in reverse, information on the fact is preferably conducted. By so doing, the driver can recognize that the vehicle is moving backward in a so-called hill start, and for example can stop the vehicle moving backward by pressing the brake pedal down.

DESCRIPTION OF THE PREFERRED EMBODIMENT

A detailed description of the present invention will be hereunder provided, with reference to the accompanying drawings.

Figure 1:
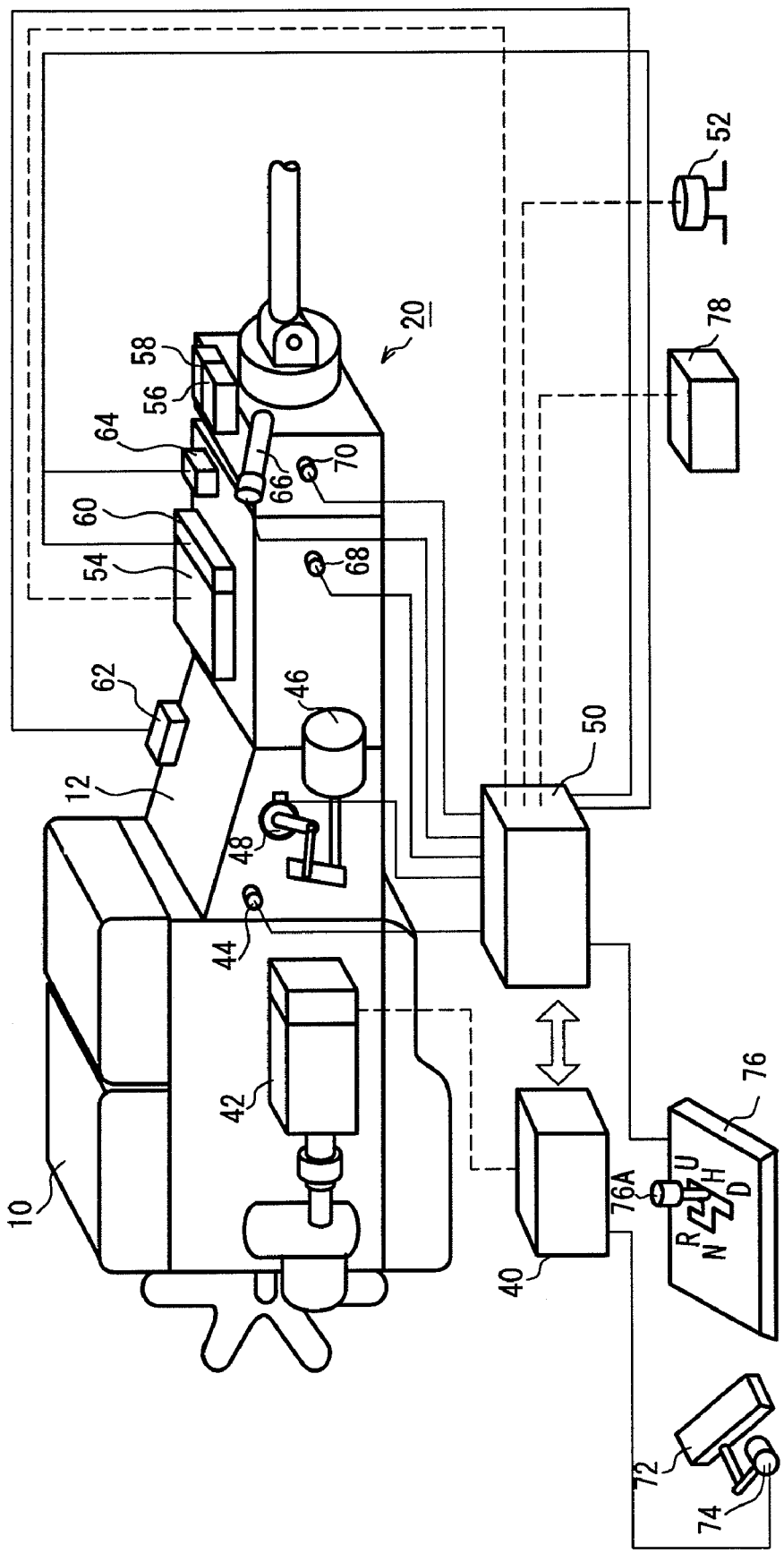
FIG. 1 is a schematic diagrammatic view of a vehicle provided with a control device for an automatic transmission according to the present invention.

FIG. 1 shows the structure of a vehicle that is provided with a control device for an automatic transmission according to the present invention.

Figure 2:
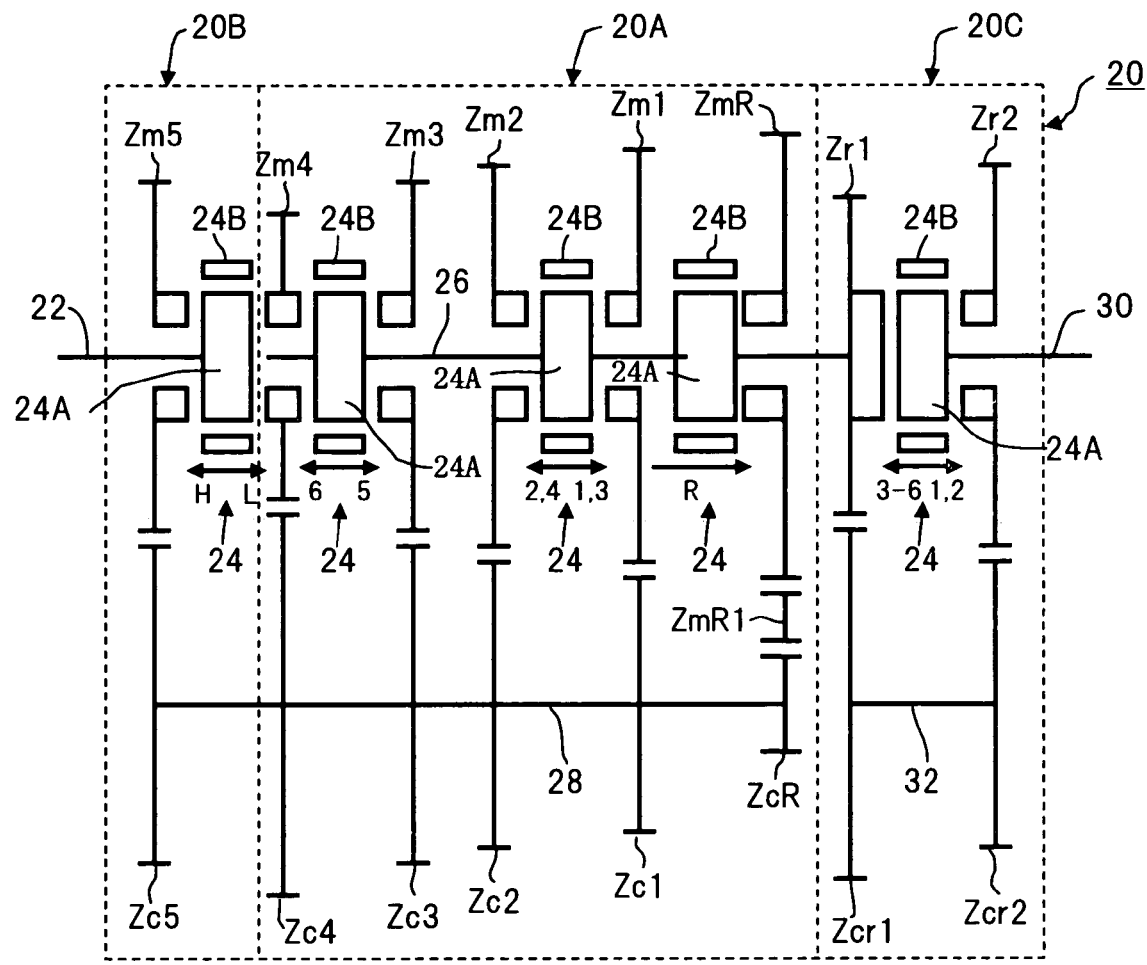
FIG. 2 is a block diagram of a transmission in the above.

A transmission 20 is fitted to an engine 10 via a mechanical clutch (reference to hereunder as "clutch") 12. As shown in FIG. 2, the transmission 20 has a structure including a main transmission 20A having input and output sides thereof to which a splitter 20B and a range 20C are connected, respectively, as sub transmission for switching to at least a high speed gear and a low speed gear.

Here, a description of the structure of the transmission 20 will be provided.

A splitter gear Zm5 for switching the splitter 20B to a high speed gear, if fitted such that it can rotate freely on an input shaft 22 to which the output from the engine 10 is input, and a synchronizer but 24A constituting a synchromesh mechanism 24, is secured to the tip end of the input shaft 22. A drive gear Zm4, a third speed gear Zm3, a second speed gear Zm2, a first speed gear Zm1 and a reverse gear ZmR, which constitute the gear shift stages of the main transmission 20A respectively, are fitted on a main shaft 26 located on the same axis as the input shaft 22, such that they can rotate freely, and a range high gear Zr1 for switching the range 20C to high speed gear is secured to the tip end of the main shaft 26. Synchronizer hubs 24A constituting synchromesh mechanisms 24 are respectively fixed to the main shaft 26 between the drive gear Zm4 and the third speed gear Zm3, the second speed gear Zm2 and the first speed gear Zm1, and the first speed gear Zm1 and the reverse gear ZmR.

A counter splitter gear Zc5, a counter drive gear Zc4, a counter third speed gear Zc3, a counter second speed gear Zc2, and a counter first speed gear Zc1, which are always engaged with the splitter gear Zm5, the drive gear Zm4, the third speed gear Zm3, the second speed gear Zm2, and the first speed gear Zm1 respectively, are secured to a main counter shaft 28 located parallel to the input shaft 22 and the main shaft 26. Furthermore, a counter reverse gear ZcR, which is always engaged with the reverse gear ZmR via a reverse idler gear ZmR1, is secured to the main counter shaft 28.

A range low gear Zr2 for switching the range 20C to a low speed gear is fitted on the output shaft 30 located on the same axis as the main shaft 26, such that it can rotate freely, and a synchronizer hub 24A constituting a synchromesh mechanism 24 is secured on the output shaft 30 at one end thereof. A range counter high gear Za1 and a range counter low gear Za2, which are always engaged with the range high gear Zr1 and the range low gear Zr2, are secured to a range counter shaft 32 located parallel to the output shaft 30.

Furthermore, a synchronizer sleeve 24B, which slides backward and forward in the direction of its axis due to an actuator (not shown in the figure), is connected using a spline on the periphery of each of the synchronizer hubs 24A, constituting the synchromesh mechanisms 24. By sliding the synchronizer sleeve 24B toward a gear to be synchronized, a synchronizer ring (not shown in the figure), is pressed onto the frictional surface of the gear to be synchronized, and relative rotation between the synchronizing gear and the gear to be synchronized is eliminated by the friction, so that the two are synchronized.

In the transmission 20 with such a structure, six gear shift stages are configured using the main transmission 20A and the range 20C, and twelve forward gear shift stages and two reverse stages are configured by shifting each of the gear shift stages by a half stage using the splitter 20B.

The engine 10 is fitted with a fuel injection pump 42 capable of controlling the fuel injection amount by an engine control unit 40 incorporating a microcomputer, and an engine rotational speed sensor 44 for detecting the engine rotational speed. Furthermore, the clutch 12 has an output shaft of a clutch booster 46 connected thereto as a clutch drive actuator, and a clutch stroke sensor 48 for detecting any one of conditions ranging from engagement to disengagement state of the clutch, from the stroke amount is, fitted thereto.

On the other hand, the transmission 20 is fitted with a main actuator 54, a splitter actuator 56, and a range actuator 58, which switch the main transmission 20A, the splitter 20B and the range 20C respectively using pneumatic pressure via a solenoid valve 52, which opens and closes under the control of a transmission control unit 50 incorporating therein a microcomputer. Moreover, the transmission 20 is fitted with a main position sensor 60, a splitter position sensor 62 and a range position sensor 64, which detect the gear shift stages of the main transmission 20A, the splitter 20B, and the range 20C. Furthermore, the transmission 20 is fitted with a vehicle speed sensor 66 (vehicle speed detecting device) for detecting the vehicle speed from the rotational speed of the output shaft 30, a main rotational sped sensor 68 for detecting the rotational speed of the main counter shaft 28, and a range rotational speed sensor 70 for detecting the rotational speed of the range counter shaft 32.

In the driver's cab there is provided; an accelerator opening sensor 74 for detecting the angle that the accelerator pedal 72 is pressed down, and a shift lever 76 for inputting gear shift instructions for the transmission 20. A twelve speed switch 76A for specifying whether the splitter 20B is switched to twelve gear shift stages or not, is installed in the shift lever 76. In addition, a monitor 78 for displaying the gear shift stage of the transmission 20 is provided in the driver's cab.

A signal from the accelerator opening sensor 74 is input to the engine control unit 40, and the fuel injection pump 42 is controlled according to the pressed down angle of the accelerator pedal 72. On the other hand, the signals from each of the engine rotational speed sensor 44, the clutch stroke sensor 48, the main position sensor 60, the splitter position sensor 62, the range rotational sensor 64, the vehicle speed sensor 66, the main rotational speed sensor 68, the range rotational speed sensor 70, and the shift lever 76, are input to the transmission control unit 50, and the solenoid valve 52 and the monitor 78 are each controlled such that automatic gear shift control or manual gear shift control is performed while inter-communicating with the engine control unit 40.

The transmission control unit 50 works in cooperation with the engine rotational speed sensor 4, the clutch booster 46, the clutch stroke sensor 48, the solenoid valve 52, the main actuator 54, the splitter actuator 56, the range actuator 58, the main position sensor 60, the vehicle speed sensor 66, the main rotational speed sensor 68, the accelerator opening sensor 74, the shift lever 76, and the monitor 78, and realizes a standby state determination device, a first gear shift control device, a reverse rotation determination device, a gear shift inhibiting device, a departure operation determination device, a second gear shift control device, and an informing device.

Figure 3:
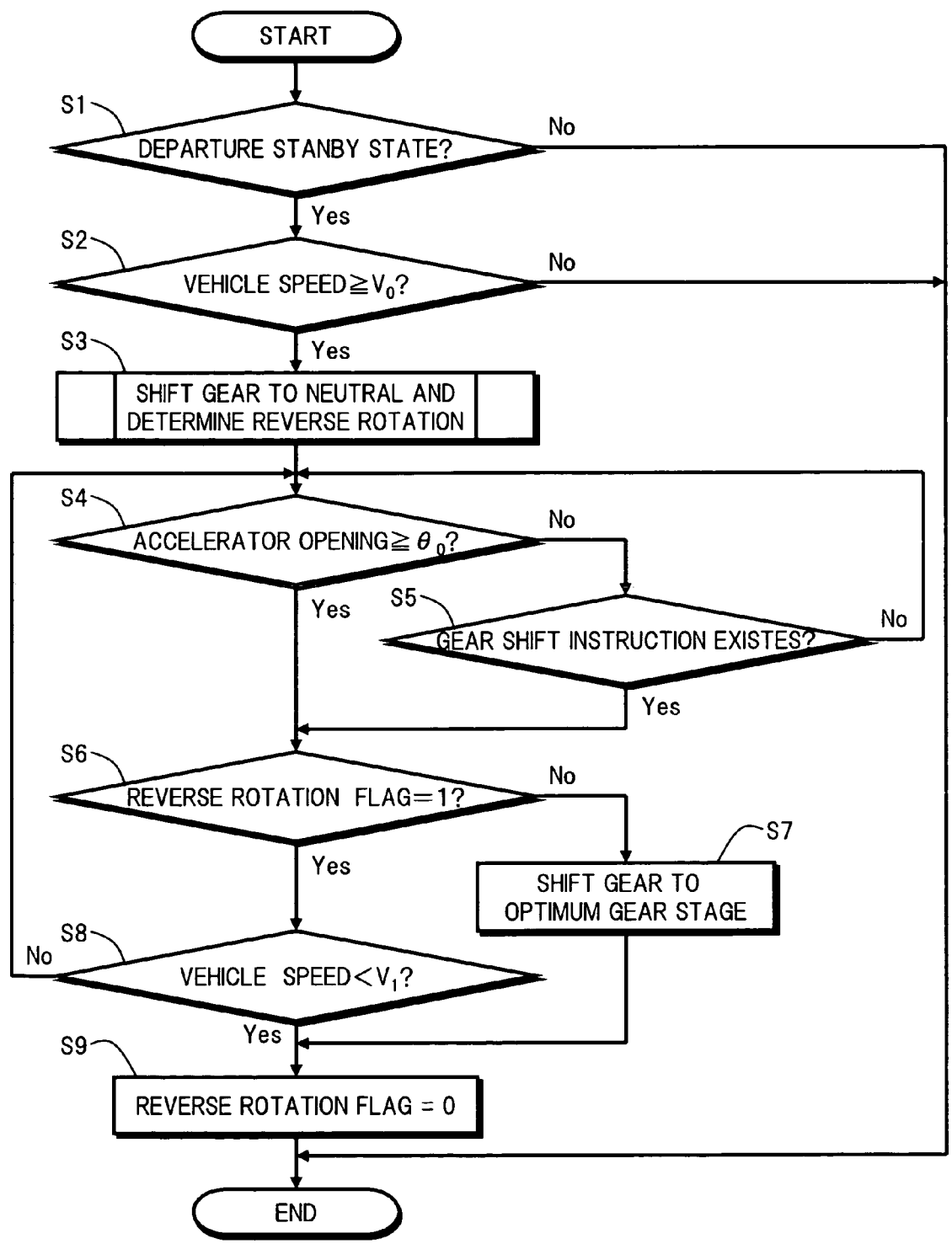
FIG. 3 is a flow chart of a main routine in relation to shift control.

FIG. 3 shows the content of the processing of a main routine performed repeatedly at predetermined intervals, in the transmission control unit 50.

In step 1 (abbreviated to "S1" in the figure, and similarly below), it is determined whether the vehicle is in a departure standby state or not. That is, based on signals from the splitter position sensor 62, the range position sensor 64, arid the main position sensor 60, it is determined whether the transmission 20 is in the drive stage (forward stage or reverse stage) or not. Furthermore, based on a signal from the clutch stroke sensor 48, it is determined whether the clutch 12 is disengaged or not. Then the transmission 20 is in the drive stage, and the clutch 12 is disengaged, it is determined that the vehicle is in a departure standby state. If the vehicle is determined to be in the departure standby state, control proceeds to step 2(Yes), while if it is determined to be not in the departure standby state, control terminates (No). The processing of step 1 corresponds to the standby state determination device.

In step 2, based on a signal from the vehicle speed sensor 66, it is determined whether the vehicle speeds greater than equal to a predetermined value $V_0$ or not. If the vehicle speed is greater than or equal to the predetermined value $V_0$, control proceeds to step 3 (Yes), while if the vehicle speed is less than the predetermined value $V_0$, control terminates (No).

Figure 4:
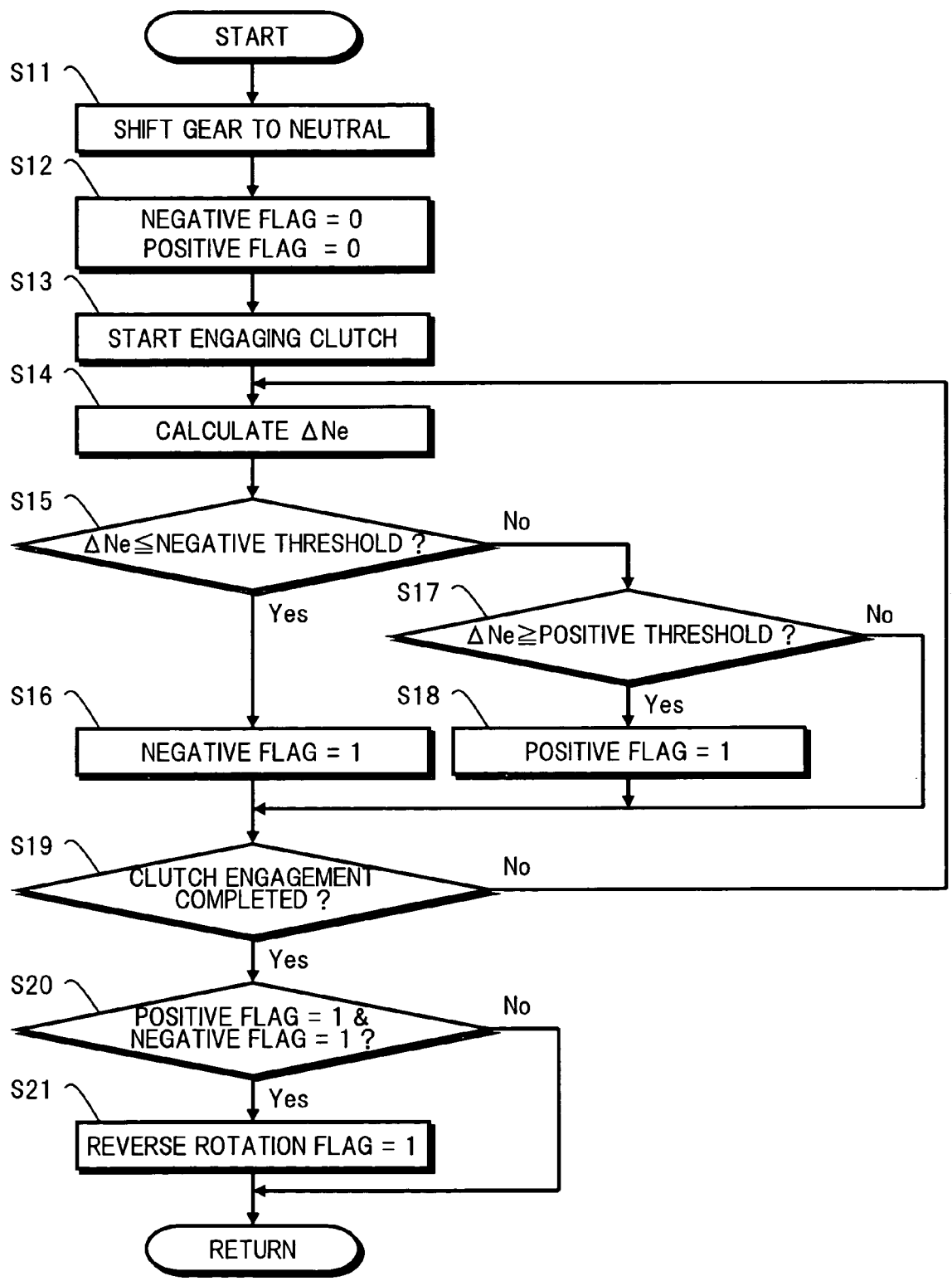
FIG. 4 is a flow chart of a subroutine in relation to gear shift control.

In step 3, the transmission 20 is shifted to the neutral, and a subroutine (details described later) as shown in FIG. 4 is called in order to determine whether the transmission 20 is being rotated in reverse or not.

In step 4, based on a signal from the accelerator opening sensor 74, it is determined whether the accelerator pedal 72 is pressed down by an angle greater than or equal to a predetermined angle $\theta_0$. If the accelerator pedal 72 is pressed down by an angle greater than or equal to the predetermined angle $\theta_0$, control proceeds to step 6 (Yes), while if it is pressed down by an angle less than the predetermined angle $\theta_0$, control proceeds to step 5 (No).

In step 5, based on a signal from the shift lever 76, it is determined whether a gear shift instruction is input or not. If a gear shift instruction is input, control proceeds to step 6 (Yes), while if a gear shift instruction is not input, control returns to step 4 (No). The series of processing of step 4 and step 5 corresponds to the departure operation determination device.

In step 6, based on a reverse rotation flag set by the subroutine, it is determined whether the transmission 20 is being rotated in reverse or not, that is whether or not the transmission 20 is being rotated in reverse based on receiving an input from the driving wheels due to the backward movement of the vehicle by a so-called hill start. If the transmission is being rotated in reverse (reverse rotation flag=1), control proceeds to step 8 (Yes), while if the transmission 20 is not being rotated in reverse (reverse rotation flag=0), control proceeds to step 7 (No). The processing of step 6 corresponds to the gear shift inhibiting device.

In step 7, since the transmission 20 is not being rotated in reverse, then based on either the state of pressing the accelerator pedal 72 down or the instruction from the shift lever 76 as with the conventional method, the transmission 20 is shifted to an optimum gear stage according to the traveling conditions, and control proceeds to step 9. The processing of step 7 corresponds to the second gear shift control device.

In step 8, based on a signal from the vehicle speed sensor 66, it is determined whether or not the vehicle speed is less than a predetermined value (stop determination vehicle speed) $V_1$. If the vehicle speed is less than the predetermined value $V_1$, control proceeds to step 9 (Yes), while if the vehicle speed is greater than or equal to the predetermined value $V_1$, control returns to step 4 (No).

In step 9, the reverse rotation flag is reset.

FIG. 4 shows the subroutine for shifting the transmission 20 to the neutral, and determining whether or not the transmission 20 is being rotated in reverse.

In step 11, the main actuator 54 is operated via the solenoid valve 52, to shift the transmission 20 to the neutral.

In step 12, each of a negative flag and a positive flag is set to zero.

In step 13, the clutch booster 46 is operated via the solenoid valve 52, to start engaging of the clutch 12.

In step 14, based on a signal from the engine rotational speed sensor 44, the rate of change of the engine speed (rotational acceleration) ΔNe is calculated.

In step 15, it is determined whether or not the rate of change of the engine speed ΔNe is less than or equal to a negative threshold (a predetermined lower limit). If the rate of change of the engine speed ΔNe is less than or equal to the negative threshold, control proceeds to step 16 (Yes), and the negative flag is set to 1. On the other hand, if the rate of change of the engine speed ΔNe is greater than the negative threshold, control proceeds to step 17 (No).

In step 17, it is determined whether or not the rate of change of the engine speed ΔNe is greater than or equal to a positive threshold (a predetermined upper limit). If the rate of change of the engine speed ΔNe is greater than or equal to the positive threshold, control proceeds to step 18 (Yes), and the positive flag is set to 1. On the other hand, if the rate of change of the engine speed ΔNe is less than the positive threshold, control proceeds to step 19 (No).

In step 19, based on a signal from the clutch stroke sensor 48, it is determined whether or not the engagement of the clutch 12 is completed. If engagement of the clutch 12 is completed, control proceeds to step 20 (Yes), while if engagement of the clutch 12 is not completed, control returns to step 14 (No).

Here, the series of processing of step 11, step 13 and step 19 corresponds to the fist gear shift control device.

In step 20, it is determined whether or not the positive flag and the negative flag are both 1, that is, in the process for engaging the clutch 12, whether or not the rate of change of the engine speed ΔNe is less than or equal to the negative threshold, and greater than or equal to the positive threshold. If the positive flag and the negative flag are both 1, control proceeds to step 21 (Yes), and the reverse rotation flag is set to 1, after which control returns to the main routine. On the other hand, if neither the positive flag nor the negative flag is 1, control returns to the main routine (No). The series of processing of step 14 through step 18, step 20 and step 21 corresponds to the reverse rotation determination device.

According to the processing described above, in a departure standby state, in which the transmission 20 is shifted to a drive stage and the clutch 12 is disengaged, if the vehicle speed is greater than or equal to the predetermined value $V_0$, the transmission 20 is shifted to the neutral, and then the clutch 12 is engaged. In the process for engaging the clutch 12, it is determined whether or not the rate of change of the engine speed ΔNe is greater than or equal to the positive threshold, and less than or equal to the negative threshold. At this time, since the transmission 20 is shifted to the neutral, even if the transmission 20 is being rotated in reverse, the inertia that the clutch 12 must bear is small, and hence there is not concern about it becoming damaged. Moreover, if the rate of change of the engine speed ΔNe is greater than or equal to the positive threshold and less than or equal to the negative threshold, it is determined that the vehicle is moving backwards in a so-called hill start, and that the transmission 20 receives an input from the driving wheels and is being rotated in reverse. Therefore, the reverse rotation flag which indicates whether or not the transmission is being rotated in reverse is set to 1.

Here, a description will be provided, with respect to a principle that can be used in the described processings that enable determination of reverse rotation of the transmission 20.

Figure 5:
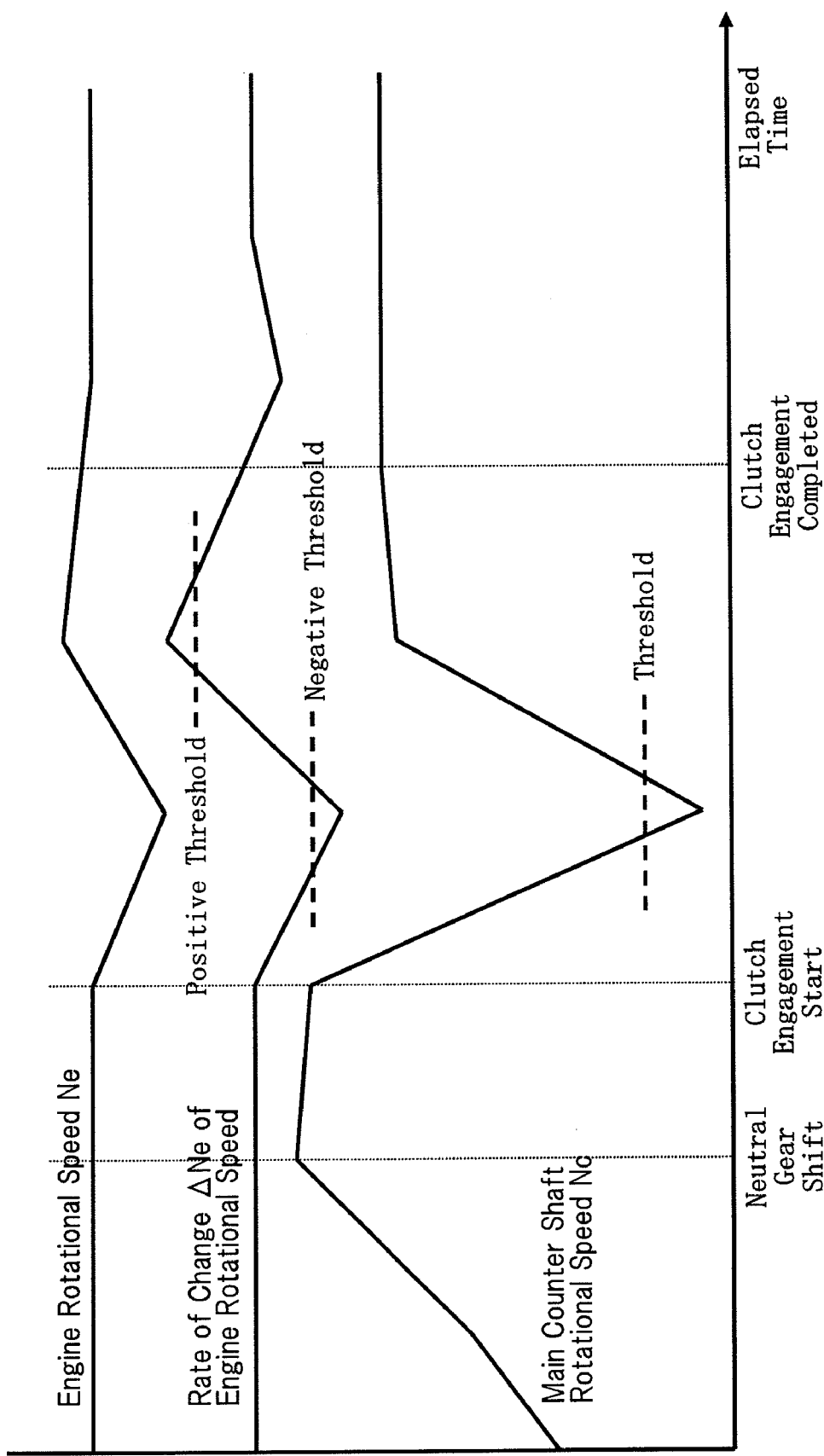
FIG. 5 is an explanatory diagrammatic view illustrating a principle for determining reverse rotation of the transmission.

FIG. 5 shows how the engine speed Ne, the rate of change of the engine speed ΔNe, and the main counter shaft rotational speed Nc change when the transmission 20 is being rotated in reverse, in the process for engaging the clutch 12 after the transmission 20 is shifted to the neutral.

When the clutch 12 starts to engage, in a state in which the transmission 20 is being rotated in reverse, the reverse rotation of the transmission 20 is cancelled gradually as the engagement state takes effect. At this time, the engine speed Ne on the clutch driving side drops gradually, due to the clutch driven side rotating in reverse. After the reverse rotation of the transmission 20 is cancelled, the engine speed Ne increase to its original state. Referring to the rate of change of the engine speed ΔNe, as the engine speed Ne drops, the rate of change ΔNe drops, and the rate of change ΔNe becomes a minimum at the point in time when the reverse rotation of the transmission 20 is cancelled. On the other hand, after the reverse rotation of the transmission 20 is cancelled, the rate of change ΔNe increases as the engine speed Ne increases, and becomes a maximum in the process where the clutch 12 is engaged completely. Therefore, it can be determined that the transmission 20 is being rotated in reverse, by detecting that the rate of change of the engine speed ΔNe is less that or equal to a negative threshold, and greater than or equal to a positive threshold, during the process for engaging the clutch 12.

It is also possible to determine reverse rotation of the transmission 20 using the rotational speed Nc of the main counter shaft 28 as the rotational speed of the driven side, instead of the rate of change of the engine speed ΔNe. That is, since the main rotational speed sensor 68 can only detect the absolute value of the rotational speed regardless of the direction of rotation, the rotational speed Nc of the main counter shaft 28 becomes zero momentarily at the point in time when the reverse rotation is cancelled. Therefore, it exhibits the characteristics shown in FIG. 5, and it is possible to determine that the transmission 20 is being rotated in reverse, by detecting that the rotational speed Nc is less than or equal to the threshold. Furthermore, it is also possible to determine reverse rotation using the rate of change ΔNc of the main counter shaft 28, which exhibits the same characteristics as the rate of change of the engine speed ΔNe, instead of the rotational speed Nc of the main counter shaft 28.

When the driver presses the accelerator pedal 72 down more than a predetermined angle $\theta_0$ in order to start the vehicle moving, or operates the shift lever 76 to input a gear shift instruction, if the reverse rotation flag is set to 0, the transmission 20 is shifted to an optimum drive stage according to the operation. On the other hand, if the reverse rotation flag is set to 1, that is, if the transmission 20 is being rotated in reverse, the transmission 20 is prevented from changing gear.

Accordingly, when the vehicle moves backward in a so-called hill start, the transmission 20 is inhibited from being shifted to a drive stage. Therefore the clutch 12 cannot be engaged in a state in which the relative rotational speed is high, which can thus protect the clutch. On the other hand, when the vehicle is not moving backward, the transmission 20 is shifted to an optimum drive stage according to the driver's operation. Therefore it is possible to start driving straight away similarly to conventionally.

Furthermore, when it is determined that the transmission 20 is being rotated in reverse, it is desirable to inform the driver of this by an information device such as a buzzer, a voice, an alarm lamp, or the like. By so doing, the driver can recognize that the vehicle is moving backward in a so-called hill start, and for example can stop the vehicle moving backward by pressing the brake pedal down. It is also possible to utilize the monitor 78 as an informing device.

INDUSTRIAL APPLICABILITY

As described above, an apparatus for and a method of controlling an automatic transmission according to the present invention can determine reverse rotation of a transmission using a simple structure, and can protect a mechanical clutch when a vehicle moves backward in a so-called shill start. Therefore, an extremely high utility of the invention can be ensured.

We claim:

1. An apparatus for controlling an automatic transmission comprising:
    a standby state determination device which determines whether a vehicle is in a departure standby state or not,
    a vehicle speed detecting device which detects vehicle speed;
    a first gear shift control device which, when it is determined by said standby state determining device that the vehicle is in a departure standby state, and the vehicle speed detected by said vehicle speed detecting device is greater than or equal to a predetermined value, shifts the transmission to a neutral, and engages a mechanical clutch;
    a reverse rotation determination device which determines whether the transmission is being rotated in reverse or not based on a rotational fluctuation on a driving side or a driven side of the mechanical clutch in a process for engaging the mechanical clutch by said first gear shift control device; and
    a gear shift inhibiting device which, when determined by said reverse rotation determination device that the transmission is being rotated in reverse, prevents said transmission from being shifted to a drive stage.

2. The apparatus for controlling an automatic transmission according to claim 1, wherein said reverse rotation determination device determines that said transmission is being rotated in reverse when in the process for engaging said mechanical clutch, a rate of change of a rotational speed on the driving side thereof or the driven side thereof becomes greater than or equal to a predetermined upper limit value and less than or equal to a predetermined lower limit value.

3. The apparatus for controlling an automatic transmission according to claim 1, wherein said reverse notation determination device determines that said transmission is being rotated in reverse when in the process for engaging said mechanical clutch, a rotational speed on the driven side thereof is less than or equal to a predetermined value.

4. The apparatus for controlling an automatic transmission according to claim 1, wherein said standby state determination device determines that the vehicle is in the departure standby state when said transmission is shifted to a drive stage and said mechanical clutch is disengaged.

5. The apparatus for controlling an automatic transmission according to claim 1, comprising:
    a departure operation determination device which determines whether or not a departure operation is being performed; and
    a second gear shift control device which, when it is determined by said departure operation determination device that a departure operation is being performed, and it is determined by said reverse rotation determination device that the transmission is not being rotated in reverse, shifts the transmission to a drive stage according to a departure operation.

6. The apparatus for controlling an automatic transmission according to claim 5, wherein said departure operation determination device determines that a departure operation is performed when an accelerator pedal is pressed down at an angle greater than or equal to a predetermined angle, or when a gear shift instruction for the transmission is input.

7. The apparatus for controlling an automatic transmission according to claim 1, comprising an informing device which when determined by said reverse rotation determination device that the transmission is being rotated in reverse, informs the fact.

8. A method of controlling an automatic transmission, through execution on a computer, comprising the steps of:
    determining whether a vehicle is in a departure standby state or not,
    shifting the transmission to a neutral, and engaging a mechanical clutch when it is determined that the vehicle is in a departure standby state, and a vehicle speed is greater than or equal to a predetermined value;
    determining whether the transmission is being rotated in reverse or not based on a rotational fluctuation on a driving side or a driven side of the mechanical clutch in a process for engaging the mechanical clutch; and
    inhibiting said transmission from being shifted to a drive stage when it is determined that the transmission is being rotated in reverse.

9. The method of controlling an automatic transmission according to claim 8, wherein
    said step to determine whether said transmission is being rotated in reverse or not determines that said transmission is being rotated in reverse when in the process for engaging said mechanical clutch, a rate of change of a rotational fluctuation on the driving side or the driven side becomes greater than or equal to a predetermined upper limit value and less than or equal to a predetermined lower limit value.

10. The method of controlling an automatic transmission according to claim 8, wherein
    said step to determine whether said transmission is being rotated in reverse or not determines that said transmission is being rotated in reverse when in the process for engaging said mechanical clutch, a rotational speed on the driven side is less than or equal to a predetermined value.

11. The method of controlling an automatic transmission according to claim 8, wherein
    said step to determine whether a vehicle is in a departure standby state or not determines that the vehicle is in a departure standby state when said transmission is shifted to a drive stage, and said mechanical clutch is disengaged.

12. The method of an automatic transmission according to claim 8, further comprising the steps of:
    determining whether or not a departure operation has been performed; and
    shifting the transmission to a drive stage according to the departure operation when it is determined that the departure operation has been performed, and it is determined that the transmission is not being rotated in reverse.

13. The method of controlling an automatic transmission according to claim 12, wherein said step to determine whether or not the departure operation has been performed determines that the departure operation has been performed when an accelerator pedal is pressed down at an angle greater than or equal to a predetermined angle, or when a gear shift instruction for the transmission is input.

14. The method of controlling an automatic transmission according to claim 8, which further comprises the step of operating an informing device which, when determined that said transmission is being rotated in reverse, informs the fact, said information device operating step being executed on a computer.

* * * * *